United States Patent
Hiszpanski

[15] 3,707,302
[45] Dec. 26, 1972

[54] HIGH PERFORMANCE FITTING
[72] Inventor: Jan A. Hiszpanski, Chicago, Ill.
[73] Assignee: I-T-E Imperial Corp.
[22] Filed: Aug. 27, 1970
[21] Appl. No.: 67,512

Related U.S. Application Data

[63] Continuation-in-part of Ser. No. 774,920, Nov. 12, 1968, abandoned.

[52] U.S. Cl. ................285/116, 285/341, 285/382.7
[51] Int. Cl. .............................................F16l 19/08
[58] Field of Search............285/116, 382.7, 341, 342

[56] References Cited

UNITED STATES PATENTS

| 2,553,619 | 5/1951 | Woodling | 285/382.7 X |
|---|---|---|---|
| 2,850,303 | 9/1958 | Bauer | 285/341 |
| 2,544,108 | 3/1951 | Richardson | 285/382.7 X |
| 3,325,192 | 6/1967 | Sullivan | 285/382.7 X |
| 2,497,273 | 2/1950 | Richardson | 285/342 X |
| 2,532,352 | 12/1950 | Woodling | 285/382.7 X |
| 3,201,153 | 8/1965 | Curvie | 285/382.7 X |
| 3,219,367 | 11/1965 | Franck | 285/382.7 X |

Primary Examiner—Thomas F. Callaghan
Attorney—Hofgren, Wegner, Allen, Stellman & McCord

[57] ABSTRACT

A tube fitting having a deflectible sleeve member arranged to be constricted by a nut member advanced toward a body member to sealingly bite into the outer wall of a tube end and sealingly engage the body member to provide a high performance tube fitting. The sleeve member includes biting means on the nose portion adjacent the body member and constrictible tube supporting means spaced substantially outwardly from the nose portion to provide an improved support of the tube at a distance from the seal. The sleeve member further includes means cooperating with the nut member for maintaining the sleeve member in association with the nut member prior to make-up of the fitting thereby to assure the proper disposition of the sleeve member relative to the nut member and to make the fitting effectively a two-part fitting prior to make-up. The maintaining means is further arranged to be displaced as the result of make-up of the fitting to permit the nut member to be moved away from the sleeve member thereby to permit disassembly of the made-up fitting and permit remaking as desired. The support portion of the sleeve member and the maintaining means may be circumferentially discontinuous to provide facilitated deflection thereof. The support means further provides a gradual stress variation along the tube to provide improved vibration resistance.

7 Claims, 6 Drawing Figures

PATENTED DEC 26 1972
3,707,302
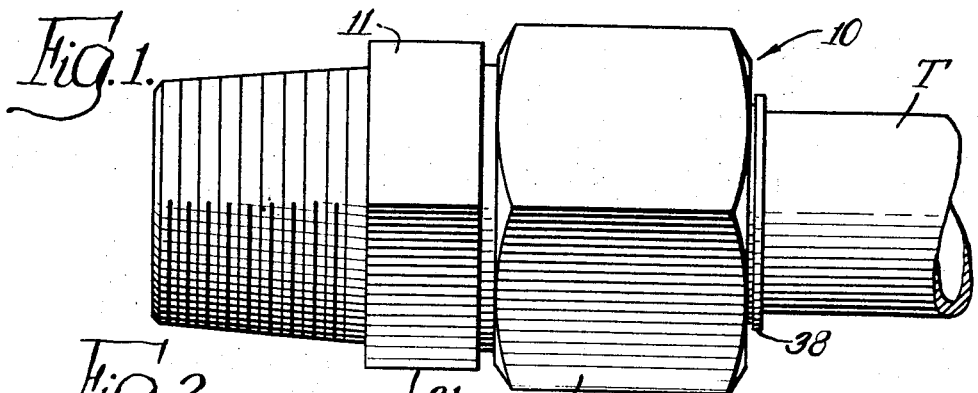
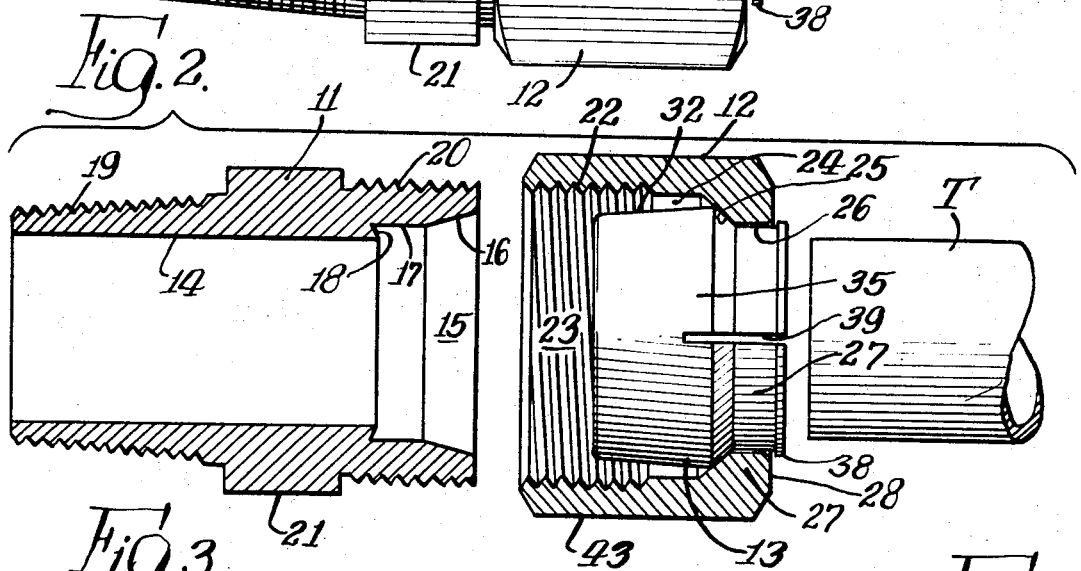
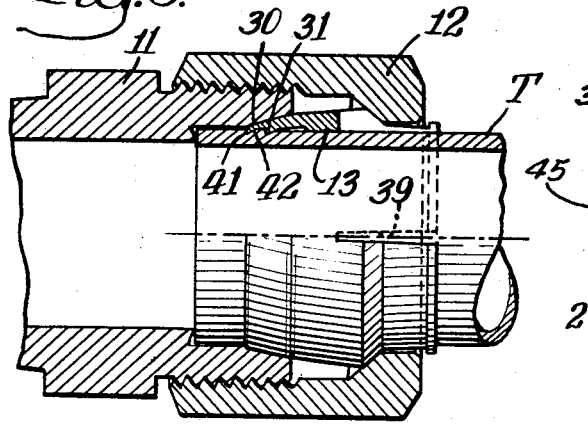
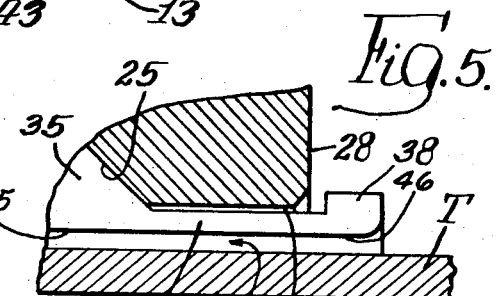
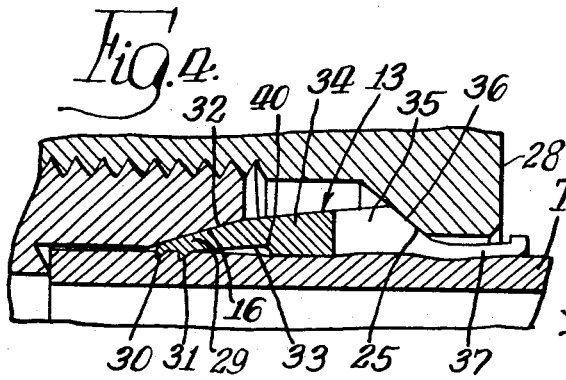
Inventor:—
Jan A. Hiszpanski,
By Hofgren, Wegner, Allen,
Stellman & McCord Attys.

HIGH PERFORMANCE FITTING

CROSS-REFERENCE TO RELATED APPLICATION

This application comprises a continuation-in-part of my copending application Ser. No. 774,920, filed Nov. 12, 1968, and now abandoned.

BACKGROUND OF THE INVENTION

1. Field of the Invention

This invention relates to tube fittings and in particular to vibration resistant tube fittings having means for biting into the tube to provide a seal therewith.

2. Description of the Prior Art

In one form of conventional flareless-type, high pressure tube fitting, a sleeve is disposed between a body member and a nut member to be urged during make-up of the fitting into sealed engagement with the tube and body member. To provide effectively positive sealing of the sleeve to the tube end, one or more annular ribs may be provided on the interior of the sleeve which are pressed into the tube wall by suitable camming means on the nut member. Further, the nose of the sleeve is conventionally forcibly urged against a flared surface on the body member to provide a seal there-between in the made-up arrangement of the fitting. In one form of such known fittings, the ribs are disposed adjacent a flared camming surface on the nut member to be urged substantially directly thereby into the tube wall. While such fittings have proven generally satisfactory in normal applications, a problem has arisen in high pressure applications particularly where vibration occurs. Such applications are common in hydraulics where steel tubing is employed for conducting fluids under relatively high pressures and in many cases in high vibration environments. There has been a limitation on the useful life of such fittings in such applications and, therefore, there has arisen a strong interest in attempting to develop an improved fitting which would provide substantially increased useful life under such adverse conditions.

Another problem arises in the conventional metal deflectible sleeve-type fitting in that the provision of the fitting in three separable parts has often resulted in an improperly made-up fitting by virtue of a backward installation of the sleeve.

SUMMARY OF THE INVENTION

The present invention comprehends an improved high performance fitting having a substantially increased useful life over that of the conventional fittings while yet having a simple and economical construction. The fitting includes a sleeve member having means cooperating with the nut member to provide maintained association of the sleeve member and nut member prior to make-up of the fitting to assure a proper disposition of the sleeve member in the fitting. The association maintaining means comprises a deflectible portion of the sleeve member which, as a result of the make-up of the fitting, has an altered configuration permitting the nut member to be withdrawn when desired to disassemble the fitting while yet permitting the sleeve member to be maintained in sealed association with the tube end. The withdrawn nut member may be reconnected to the body member as desired to remake the fitting.

The sleeve member is provided with a plurality of sealing ribs on the nose portion thereof adapted to be forcibly urged into sealing engagement with the tube wall as a result of the make-up of the fitting. The deflectible nose portion is arranged to be constricted by a forcible engagement thereof with a flared camming surface on the body member against which the nose portion is urged as a result of the advancement of the nut member toward the body member during the make-up of the fitting.

The nut member further coacts with the sleeve member to urge a rearward support portion thereof constrictively inwardly thereby to provide an improved positive support of the tube end at a point spaced rearwardly of the sealing nose portion thereby to provide an improved vibration resistant sealed retention of the tube end in the fitting.

The support portion comprises a circumferentially discontinuous portion of the sleeve member for facilitated constriction thereof by a flared camming surface of the nut member. The constrictible support portion is carried on a substantially rigid annular midportion of the fitting in a rearwardly cantilevered fashion for an improved graduated stress distribution along the tube length.

Extending rearwardly from the support portion is a plurality of fingers having turned ends adapted to pass through an outer inturned flange of the nut member and to be received outwardly thereof thereby to maintain the sleeve member in association with the nut member prior to make-up of the fitting. The fingers are effectively cantilevered rearwardly from the support portion. As a result of the cantilevered construction of the support and finger portions, the fingers are deflected in a graduated manner along their length inwardly during the make-up of the fitting whereby the turned ends are brought inwardly toward the axis of the tube end thereby to permit the nut flange to clear the turned ends after completion of make-up of the fitting, thereby to permit disassembly of the fitting when desired. The sleeve member is effectively retained in sealed association with the tube end when the nut member is withdrawn so that subsequent remaking of the fitting is permitted.

As a result of the improved graduated stress distribution along the tube length, the tube is supported in an improved manner rearwardly of the sealed connection of the sleeve member nose end thereto thereby providing a substantially improved vibration resistant sealed connection of the tube end. It has been found that the improved construction of the present invention provides a substantial increase in the useful life of such a fitting in adverse vibratory environments with the fitting carrying high pressures such as required in hydraulics applications. The fitting provides such improved functioning while yet being simple and economical of construction.

BRIEF DESCRIPTION OF THE DRAWING

Other features and advantages of the invention will be apparent from the following description taken in connection with the accompanying drawings wherein:

FIG. 1 is a side elevation of a fitting embodying the invention connected to a tube end;

FIG. 2 is an exploded diametric section of the fitting prior to the make-up thereof;

FIG. 3 is a fragmentary diametric section thereof upon completion of make-up of the fitting;

FIG. 4 is a fragmentary enlarged view of a portion of the structure illustrated in FIG. 3;

FIG. 5 is an enlarged fragmentary section illustrating the arrangement of the association maintaining means prior to make-up of the fitting; and FIG. 6 is a view similar to that of FIG. 5 but illustrating the arrangement of the association maintaining means upon completion of make-up of the fitting.

DESCRIPTION OF THE PREFERRED EMBODIMENT

In the exemplary embodiment of the invention as disclosed in the drawing, a fitting generally designated 10 is shown to comprise a body member 11, a nut member 12 and a sleeve member 13 cooperatively associated for connection to a tube end T. As shown in FIG. 2, in the arrangement of the fitting prior to make-up, the sleeve member 13 is maintained in association with the nut member 12 whereby the fitting effectively comprises a two-part fitting at that time. However, upon completion of make-up of the fitting as shown in FIG. 3, the nut member 12 and sleeve member 13 may be separated by a withdrawal of the nut member along the tube end T away from the body member 11 whereby the fitting effectively comprises a three-part fitting adapted for subsequent remaking as desired.

More specifically, body member 11 is provided with a through bore 14 opening into an end recess 15 defined by a flared camming surface 16 and a cylindrical surface 17. The inner end of the recess 15 is defined by an undercut annular surface 18 through which the bore 14 opens. As shown in FIG. 2, camming surface 16 comprises a frustoconical surface narrowing forwardly toward the bore 14. The body member includes an externally threaded forward portion 19 and an externally threaded rearward portion 20. Suitable flats 21 may be provided on the mid-portion of the body member as for engagement by a suitable tool, such as a wrench, for facilitated make-up of the fitting.

Nut member 12 includes an internally threaded portion 22 adapted to have threaded association with the externally threaded portion 20 of the body member. The nut member 12 defines a through bore 23 including a cylindrical surface 24, a rearwardly narrowing frustoconical camming surface 25 and a rearward cylindrical surface 26. Camming surface 25 and cylindrical surface 26 define the forward and inner surfaces of a rear inturned flange 27 of the nut member 12. The rearwardly outer surface 28 of the flange 27 as shown is planar.

The sleeve member 13 includes a nose portion 29 provided with a pair of radially inwardly projecting annular sharp ribs 30 and 31. The outer surface 32 of the sleeve member 13 is frustoconical narrowing forwardly and the inner surface 33 of the nose has an original diameter slightly larger than the outer diameter of tube end T and extends rearwardly to a substantially rigid annular mid-portion 34 of the sleeve member. The internal diameter of the mid-portion 34 is less than that of the surface 33 whereby the nose portion 29 comprises a forwardly cantilevered, deflectible portion of the sleeve member 13.

Sleeve member 13 further defines a circumferentially discontinuous support portion 35 effectively cantilevered rearwardly from the mid-portion 34 for facilitated constriction thereof into supporting association with the tube end T. Sleeve portion 35 includes a frustoconical, forwardly widening reaction surface 36 against which the camming surface 25 of the nut member 12 bears during make-up of the fitting.

Extending rearwardly from the support portion 35 is a plurality of equiangularly circumferentially spaced fingers 37 having an original radial spacing from the axis of the sleeve member slightly greater than the outside diameter of the tube end T to define a clearance space 44 therebetween. The fingers 37 include radially outturned ends 38 having a maximum diameter greater than the diameter of surface 26 whereby the fingers extend to axially outwardly of the nut member outer surface 28 to maintain the sleeve member 13 in association with the nut member 12 prior to make-up of the fitting. The sleeve member 13 is preferably formed of a somewhat resilient material, such as metal, permitting the fingers to be resiliently constricted toward the axis of the sleeve member by a movement of the nut camming surface 25 against the ends 38 whereupon the nut member 12 may be moved coaxially over the turned ends 38 to the initially assembled arrangement of the fitting as shown in FIG. 5. When the turned ends 38 pass to beyond the cylindrical surface 26, the resiliency of the fingers causes them to assume the position therein illustrated.

As best seen in FIGS. 2 and 3, the support portion 35 and fingers 37 are effectively defined by a plurality of slits 39 extending parallel to the axis of the sleeve member 13. In the illustrated embodiment, four such slits are provided, it being understood that any suitable number may be employed.

The angles of the nut camming surface 25 and the sleeve reaction surface 36 may be similar. Thus, as shown in FIG. 4, the nut camming surface 25 bears against the sleeve reaction surface 36 during make-up of the fitting to urge the surface 32 of the nose portion 29 against the body camming surface 16. As the nose portion is effectively cantilevered forwardly from the substantially rigid mid-portion 34 and the support portion 35 and fingers 37 are effectively cantilevered rearwardly therefrom, a radially inward deflection of the nose portion, support portion and fingers is effected in a graduated manner relative to the mid-portion 34. Thus, as shown in FIG. 4, the annular ribs 30 and 31 bite fully into the tube wall at the forward end of the sleeve member. The support portion 35, as shown in FIG. 6, is urged radially against the tube wall rearwardly of the mid-portion 34 and sufficient force may be applied by the nut member 12 to deflect the tube wall inwardly somewhat by the constriction of the support portion 35. However, as shown in FIG. 6, the cantilevered arrangement of the fingers 37 causes them to nonuniformly constrict the tube with the constriction stress gradually decreasing rearwardly toward the ends 38. Sufficient constriction of the support portion 35, however, is effected in the make-up of the fitting so as to cause the ends 38 to have an outside diameter less than the diameter of the cylindrical surface 26 whereby the nut member may clear the finger ends 38 as best seen in FIG. 4 to permit axial withdrawal of the nut member (to the right) as for disassembling the fitting. In such a disassembly, the sleeve member 13 remains sealingly secured to the tube end and, thus, the fitting may be remade subsequently as desired.

The frustoconical outer surface 32 of the sleeve nose portion may have a relatively small forwardly narrowing angle, such as approximately 4°, relative to the sleeve member axis. The body camming surface 16 preferably has a greater angle and illustratively may have an angle of approximately 15° to the fitting axis. In the original nondeflected arrangement, the sleeve nose surface 33 may be cylindrically parallel to the sleeve member axis. Thus, the nose tapers somewhat rearwardly from the forward end to the relatively thick continuously angular mid-portion 34. The surface 33 may include a rearwardly narrowing frustoconical end portion 40 which in the undeflected form of the sleeve member may have an angle of approximately 20° to the axis.

The ribs 30 and 31 as shown in FIG. 3 may have an annular planar front surface 41 and a frustoconical rearwardly widening rear surface 42 for improved positive tube retention when forced into the tube wall as shown in FIG. 4.

In the illustrated embodiment, the fitting members are formed of a suitable strong material, such as metal. Thus, the fitting members may be readily formed by simple machining operation whereby the fitting is extremely simple and economical of construction.

The make-up of the fitting is extremely simple. The user merely inserts the tube end T coaxially through the sleeve member 13 which is retained in association with the nut member 12 as shown in FIG. 2. The nut member 12 is threaded onto the body portion 20 and advanced as by finger-turning to bring the sleeve nose portion 29 into engagement with the body camming surface 16. The tube end T is disposed to abut the body surface 18. Further advance of the nut member 12 as by application of a wrench, or other suitable tool, thereto, the nut member 12 being provided with suitable flats 43 for cooperation therewith, urges camming surface 25 of nut member 12 against the reaction surface 36 of the sleeve member 13. As the advance of the nut member 12 is continued, the nose portion 29 is deflected by the body camming surface 16 to press the sealing ribs 30 and 31 into the tube wall adjacent the inner end of the camming surface 16 to provide a rigid sealed connection of the sleeve member 13 to the tube end T. At the same time, the support portion 35 is constricted against the tube wall rearwardly of the midportion 34 to provide an effectively positive support of the tube end T substantially rearwardly of the sealing ribs 30 and 31. As the support forces are nonabruptly applied by the cantilevered support portion 35 and fingers 37, an improved vibration resistant support of the tube is provided substantially increasing the useful life of the fitting in adverse environments, such as in adverse vibratory environments. As discussed above, the make-up of the fitting rearranges the sleeve member relative to the nut member to permit ready disassembly when desired by displacing the turned ends 38 of the fingers 37 inwardly of the nut surface 28. As the tube support provided by sleeve portions 35 and 37 is substantially rearwardly of the sealing means, an improved resistance against angular deflection of the tube relative to the sealing means is obtained thereby effectively increasing the life of the sealed connection provided by the annular ribs 30 and 31.

As indicated above, disassembly of the fitting is effected simply by reverse threading of the nut member to withdraw the nut member axially away from the sleeve member and permit the sleeve member to be retained in sealed association with the tube end for subsequent remaking of the fitting.

Referring now more specifically to FIG. 3, fitting 10 is arranged to provide an improved sealed connection to tube end T by preselection of a number of parameters of the fitting portions. Thus, the angle of frustoconical body member camming surface 16 may be within the conventional range of approximately 12 to 15 degrees to the axis of the fitting. The tips 44 of ribs 30 and 31, as discussed above, have a diameter slightly larger than the outside diameter of the tube end T to permit the sleeve to slip freely onto the tube. Conventionally, hydraulic tubing is manufactured with diametric tolerances in the range of plus or minus 0.004 inch. Thus, the diameter of tips 44 should be at least 0.004 inch larger than the nominal tube diameter. It has further been found that the nose end of the sleeve 13 will tend to buckle upon excessive inward deformation thereof. More specifically, it has been found that the amount of radial constriction of the nose end should be limited to approximately 0.010 inch to prevent such buckling and correspondingly prevent leakage of the fitting. Resultingly, the diameter of tips 44 is preferably 0.004 to 0.006 inch larger than the nominal tube diameter thereby providing a clearance of from zero to 0.002 inch.

It has been found, however, that such a small clearance would be insufficient to permit proper deflection of the turned ends 38 of fingers 37 suitable to provide the retained association of the sleeve and nut in the original arrangement and the separable association thereof upon completion of the make-up of the fitting. Thus, it has been found desirable to provide an increased diameter of the inner surface 45 of sleeve portion 35 and inner surface 46 of fingers 37. It has been found desirable to provide a clearance between surfaces 45 and 46 relative to the outer diameter of tube end T of approximately 0.003 to 0.005 corresponding to the desired radial extent of the turned shoulders 38. Correspondingly, the diameter of surfaces 45 and 46 is preferably approximately 0.006 to 0.010 inch larger than the outside diameter of tube end T.

Thus, the outturned shoulders 38 preferably have an unconstricted outer diameter greater than the diameter of the cylindrical nut member surface 26 with the fingers 37 having an unconstricted inner diameter larger than the outside diameter of tube end T by at least the difference between the outer diameter of the shoulders 38 and the diameter of the nut member surface 26.

As discussed above, the angle of surface 16 is conventionally approximately 12° to 15° to provide the desired ratio of the axial force generated by nut 12 to the radial force generated thereby on the sleeve. By suitably controlling the ratio of the axial to radial forces generated by the nut, a preselected penetration of the ribs 30 and 31 into the tube end may be effected concurrently with a desired constriction of the tube end by sleeve portion 35 and a deflection of the fingers 37 suitable to provide clearance for freely passing the nut member axially outwardly subsequent to make-up of the fitting. It has been found that the use of an angle of surfaces 25 and 36 of approximately 37° to 40° provides the desired correlation of the forces suitable to effect such concurrent constriction and deflection. Larger angles have been found to provide insufficient constriction force thereby insufficiently deflecting the fingers and supporting the tube at the outer end of the sleeve. Small angles cause the sleeve to be constricted radially inwardly prematurely preventing proper penetration of the ribs 30 and 31 into the tube end at the front end of the fitting. An angle of approximately 37° has been found highly desirable for use with smaller fitting sizes and an angle of 40° desirable for use with larger fitting sizes such as fitting sizes of ⅝ inch and up.

Thus, the invention broadly comprehends the provision of such a sleeve having a sealing means at the nose end adapted to sealingly engage the tube end as the result of a radial constriction effected by a camming of the nose end inwardly toward the tube end during the make-up of the fitting while concurrently effecting constriction of an outer end of the sleeve into gripping association with the tube end wherein the tube is somewhat constricted by the forceful constriction of the outer sleeve end portion. Concurrently, fingers cantilevered axially outwardly from the constrictible outer portion of the sleeve are deflected inwardly to permit shoulders thereon to be disposed radially within the path of movement of the nut member so as to permit free disassociation of the nut member from the body member and thus disassembly of the fitting without affecting the retention of the sleeve on the tube end.

The foregoing disclosure of specific embodiments is illustrative of the broad inventive concepts comprehended by the invention.

I claim:

1. A tube fitting comprising: a body member having a through bore and a recess at one end of the bore defining an axially inwardly narrowing flared camming surface extending at an angle to the axis of the bore of approximately 12° to 15° and an annular shoulder for abutment of a tube end extended coaxially inwardly through said recess; a nut member having a through bore defined by an axially inwardly widening flared camming surface and an axially outer cylindrical surface for coaxial extension of the tube end therethrough, the diameter of said cylindrical surface being greater than the outer diameter of the tube end to define an annular clearance space therebetween, said nut member being associated with said body member for selective advancement of said nut member camming surface toward said body member; and a sleeve member coaxially received in said nut member bore and body member recess, said sleeve member having a deflectible nose portion provided with an annular tube biting means having an inner diameter of approximately 0.004 to 0.006 inch larger than the nominal outer diameter of the tube end, a substantially rigid annular mid-portion, a rear portion including a forward end defining a radially outer flared reaction surface and a radially inner tube supporting surface, said nut member camming surface and sleeve reaction surface being at an angle of approximately 37° to 40° to the axis of the nut and sleeve, and a plurality of annularly spaced fingers cantilevered fully rearwardly from said forward end and provided with distal radially outturned shoulder means having an unconstricted outer diameter greater than the diameter of said cylindrical nut member surface, said fingers having an unconstricted inner diameter throughout their length approximately 0.006 to 0.010 inch larger than the nominal outer diameter of the tube end and the difference between said finger inner diameter and tube end outer diameter being at least the difference between said outer diameter of said shoulder means and the diameter of said cylindrical nut member surface, said nut camming surface, sleeve member reaction surface, and body member camming surface being arranged angularly to the axis of the fitting suitably to cause as a result of make-up of the fitting said tube supporting surface to be constricted sufficiently to constrict the tube end therein to a preselected amount, said tube biting means concurrently to bite into the tube end to a preselected amount, and said fingers to be deflected radially inwardly an amount less than that of said tube supporting surface and at least equal to said difference between said outer diameter of said shoulder means and the diameter of said cylindrical nut member surface while maintaining the diameter of said nut member cylindrical surface substantially constant whereby said sleeve is sealingly secured to said tube end with said shoulder means being arranged to pass said nut member freely axially outwardly as desired.

2. The tube fitting of claim 1 wherein said tube biting means comprises a plurality of sharp annular ribs.

3. The tube fitting of claim 1 wherein said forward end of said rear portion comprises a split annular portion arranged to be constricted about the tube.

4. The tube fitting of claim 1 wherein said forward end of said rear portion has a radial thickness at least as great as the radial thickness of said mid-portion.

5. The tube fitting of claim 1 wherein each of said nose portion and rear portion are effectively constrictively cantilevered from said mid-portion as a result of make-up of the fitting.

6. The tube fitting of claim 1 wherein said fingers apply a rearwardly decreasing tube supporting force to prevent abrupt high tube stress elevation at the rear end of said rear portion.

7. The tube fitting of claim 1 wherein said fingers are equally spaced.

* * * * *